United States Patent
Lima et al.

(10) Patent No.: US 12,108,112 B1
(45) Date of Patent: Oct. 1, 2024

(54) SYSTEMS AND METHODS FOR PREDICTING VIOLATIVE CONTENT ITEMS

(71) Applicant: Spotify AB, Stockholm (SE)

(72) Inventors: Antonio Lima, London (GB); Shahar Elisha, London (GB); Mariano Beguerisse Díaz, London (GB); Maria Dominguez, London (GB)

(73) Assignee: Spotify AB, Stockholm (SE)

( * ) Notice: Subject to any disclaimer, the term of this patent is extended or adjusted under 35 U.S.C. 154(b) by 16 days.

(21) Appl. No.: 18/060,520

(22) Filed: Nov. 30, 2022

(51) Int. Cl.
*H04N 21/454* (2011.01)
*H04N 21/258* (2011.01)

(52) U.S. Cl.
CPC ..... *H04N 21/454* (2013.01); *H04N 21/25866* (2013.01)

(58) Field of Classification Search
None
See application file for complete search history.

(56) References Cited

U.S. PATENT DOCUMENTS

| | | | | |
|---|---|---|---|---|
| 5,867,226 A * | 2/1999 | Wehmeyer | ............ | H04N 21/47 725/43 |
| 9,363,561 B1 * | 6/2016 | Harmon | ........... | H04N 21/26258 |
| 9,461,958 B1 * | 10/2016 | Green | ..................... | H04L 51/52 |
| 2002/0188949 A1 * | 12/2002 | Wang | ................. | H04N 21/4668 725/50 |
| 2003/0093784 A1 * | 5/2003 | Dimitrova | ........ | H04N 21/42201 725/35 |
| 2009/0241198 A1 | 9/2009 | Takagi et al. | | |
| 2012/0117221 A1 | 5/2012 | Katpelly et al. | | |
| 2018/0077458 A1 * | 3/2018 | McCarty | ............ | H04N 21/4751 |
| 2018/0152763 A1 * | 5/2018 | Barlaskar | ........... | H04N 21/4668 |
| 2018/0332347 A1 * | 11/2018 | Hamiti | .................. | G06F 16/435 |
| 2018/0376205 A1 * | 12/2018 | Oswal | .................. | G06T 19/006 |
| 2019/0373322 A1 * | 12/2019 | Rojas-Echenique | ... | G06N 3/045 |
| 2020/0364727 A1 | 11/2020 | Scott-Green et al. | | |
| 2021/0004398 A1 | 1/2021 | Chiarandini et al. | | |
| 2023/0164389 A1 * | 5/2023 | Zhang | ................ | H04N 21/4662 725/28 |

FOREIGN PATENT DOCUMENTS

| WO | WO-9966726 A1 * | 12/1999 | ....... H04N 21/25891 |
|---|---|---|---|
| WO | WO-2004036893 A2 * | 4/2004 | ......... G06Q 30/0251 |

* cited by examiner

*Primary Examiner* — William J Kim
(74) *Attorney, Agent, or Firm* — Morgan, Lewis & Bockius LLP

(57) ABSTRACT

An electronic device identifies a set of seed content items that correspond to violative content items. The electronic device determines, using playback histories indicating consumption of respective content items, connections between a respective content item and a first audience that has consumed the respective content item and that has consumed at least a threshold number of seed content items from the set of seed content items. The electronic device provides information corresponding to the connections as an input to a machine learning model. The electronic device receives, as an output from the machine learning model, likelihoods that respective content items are violative content items and stores a set of content items, selected using the output from the machine learning model, as candidate content items in accordance with a determination that the content item satisfies likelihood criteria.

20 Claims, 8 Drawing Sheets

500

502 Identify a set of seed content items, wherein each seed content item in the set of seed content items corresponds to a violative content item.

504 Access a respective playback history for respective content items.

508 Determine, using the playback histories indicating consumption of respective content items, connections between a respective content item and a first audience that has consumed the respective content item and that has consumed at least a threshold number of seed content items from the set of seed content items.

506 Identities of users In the first audience are anonymized.

510 Determine that a respective audience has consumed respective seed content item from the set of seed content items in accordance with a determination that the audience has consumed the respective seed content item within a predefined time period.

512 Train, using unsupervised learning, a machine learning model using the connections and information about respective content.

514 Provide information corresponding to the connections as an input to the machine learning model.

> 516 Identify, using the playback histories, a second audience, distinct from the first audience, that has consumed the respective content item and content items having an unknown violative status. Provide information corresponding to the second audience as an input to the machine learning model.
>
>> 518 Obtain a graph that includes:
>> - a plurality of content items, including the seed content items and the respective content item;
>> - the first audience and the second audience;
>> - edges connecting a user in a respective audience with one or more content items of the plurality of content items, wherein each edge indicates the user in the respective audience has consumed the content item;
>> - wherein providing information corresponding to the connections comprises providing information corresponding to the edges in the graph as an input to a machine learning model.

↓

520 For the respective content item, identify one or more consumption statistics of the respective content item. Provide the one or more consumption statistics of the respective content item as an input to the machine learning model.

↓

522 Receive, as an output from the machine learning model, likelihoods that respective content items are violative content items.

> 524 A content item is violative in accordance with the content item including dangerous content, deceptive content, inappropriate content, and/or illegal content.

526 Store a set of content items, selected using the output from the machine learning model, as candidate content items in accordance with a determination that the content item satisfies likelihood criteria.

528 The stored set of content items as candidate content items, are not included in the identified set of seed content items

530 The set of content items comprises a set of podcast episodes.

532 Update the set of seed content items to a second set of content items that includes content items from the one or more candidate content items.

534 In accordance with a determination that the content item satisfies the likelihood criteria, remove the content item from a playlist.

536 In accordance with a determination that the content item satisfies the likelihood criteria, forgo displaying a representation of the content item in a user interface displayed on a user device.

538 In accordance with a determination that the content item satisfies the likelihood criteria, display a user interface element that includes a warning that the content item is likely to be a violative content item.

FIG. 5C

SYSTEMS AND METHODS FOR PREDICTING VIOLATIVE CONTENT ITEMS

TECHNICAL FIELD

The disclosed embodiments relate generally to media provider systems, and, in particular, to identifying content that violates a policy of the media provider.

BACKGROUND

Recent years have shown a remarkable growth in consumption of digital goods such as digital music, movies, books, and podcasts, among many others. As more content is accessible to users through a media-providing platform, it can be challenging for the media-providing platform to identify content that is not appropriate.

SUMMARY

A media content provider may enable content creators to upload media content to be consumed by users of the media content provider, using a platform provided by the media content provider. While some solutions exist for detecting certain types of violative content, such as expletive content, these solutions are limited to the analysis of the content's transcriptions, and the detection of keywords and phrases that are known to be inappropriate. There is a need to efficiently identify with greater precision, from a large library of media content that changes (e.g., grows) over time, media content that is likely to violate one or more policies of the media content provider, including dangerous content, deceptive content, inappropriate content, and/or illegal content.

In the disclosed embodiments, systems and methods are provided for predicting whether a media item (e.g., a podcast episode, audio book, music track, or video) is likely to include content that violates a policy (e.g., violence, misinformation, etc.) of the media-providing service. Unlike a keyword search or other content-based detection methods that are limited to analyzing content, the system uses user-item interaction data as an input to train a machine-learning model. The system analyzes the consumption history of known instances of violative content (e.g., seed content items), as well as the consumption history of the rest of the items in the media catalog (e.g., which may or may not be violative and have yet to be labelled as violative). The system identifies potential violative content items (e.g., "candidate content items") to optionally be provided to a human reviewer, based on how many ways you can reach either violative content and non-violative content from a list of candidate content, through a common audience. For example, a bigger overlap between a respective candidate's audience and content already deemed violative (e.g., the one or more seed content items), corresponds to a higher likelihood that the respective candidate is also violative. Specifically, each candidate is given a "score" that determines how significant this overlap is. The score is used to rank items that are more likely to be violative. Top ranked items can be flagged as candidates for review by human experts.

To that end, in accordance with some embodiments, a method is provided. The method includes identifying a set of seed content items, wherein each seed content item in the set of seed content items corresponds to a violative content item. The method includes accessing a respective anonymized playback history for each user of a plurality of users. The method further includes determining, using the playback histories, connections between a respective content item and a first set of users in the plurality of users that have consumed the respective content item and that have consumed at least a threshold number of seed content items from the set of seed content items. The method includes providing information corresponding to the connections as an input to a machine learning model. The method includes receiving, as an output from the machine learning model, likelihoods that respective content items are violative content items. The method further includes storing a set of content items, selected using the output from the machine learning model, as candidate content items in accordance with a determination that the content item satisfies likelihood criteria.

In accordance with some embodiments, an electronic device is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods for identifying violative media content.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5C are flow diagrams illustrating a method of predicting violative candidate content items, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
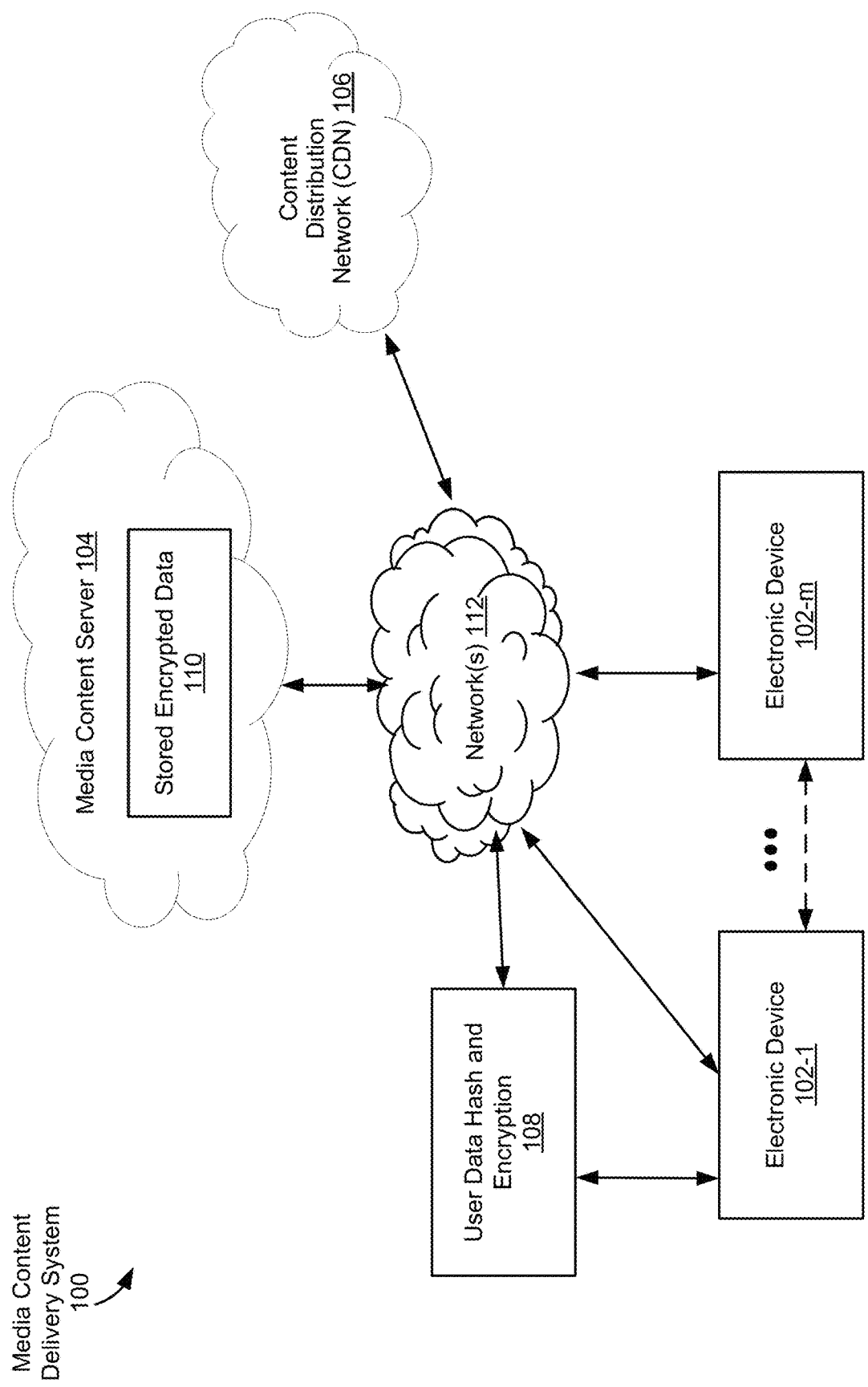
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-$m$, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-$m$ are the same type of device (e.g., electronic device 102-1 and electronic device 102-$m$ are both speakers). Alternatively, electronic device 102-1 and electronic device 102-$m$ include two or more different types of devices.

In some embodiments, electronic devices 102-1 and 102-$m$ send and receive media-control information through network(s) 112. For example, electronic devices 102-1 and 102-$m$ send media control requests (e.g., requests to play music, podcasts, movies, videos, or other media items, or playlists thereof) to media content server 104 through network(s) 112. Additionally, electronic devices 102-1 and 102-$m$, in some embodiments, also send indications of media content items to media content server 104 through network(s) 112. In some embodiments, the media content items are uploaded to electronic devices 102-1 and 102-$m$ before the electronic devices forward the media content items to media content server 104.

In some embodiments, electronic device 102-1 communicates directly with electronic device 102-$m$ (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-$m$. In some embodiments, electronic device 102-1 communicates with electronic device 102-$m$ through network(s) 112. In some embodiments, electronic device 102-1 uses the direct connection with electronic device 102-$m$ to stream content (e.g., data for media items) for playback on the electronic device 102-$m$.

In some embodiments, electronic device 102-1 and/or electronic device 102-$m$ include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, electronic device 102-1 includes user-related data for the user of electronic device 102-1. The user-related data is transformed or processed by data hashing and encryption services (e.g., using user data has and encryption 108), from a low entropy data format into a high entropy format so that the real user account information and interaction data is not identifiable by humans (e.g., user-related data is anonymized). In some embodiments, the transformed user data is stored (e.g., stored encrypted data 110) by the media-providing service (e.g., at media content server 104 or another device in communication with media content server 104). As such, only the hashed and encrypted data is stored such that it cannot be decrypted and/or dehashed to protect any user-related data obtained from electronic device 102-1.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
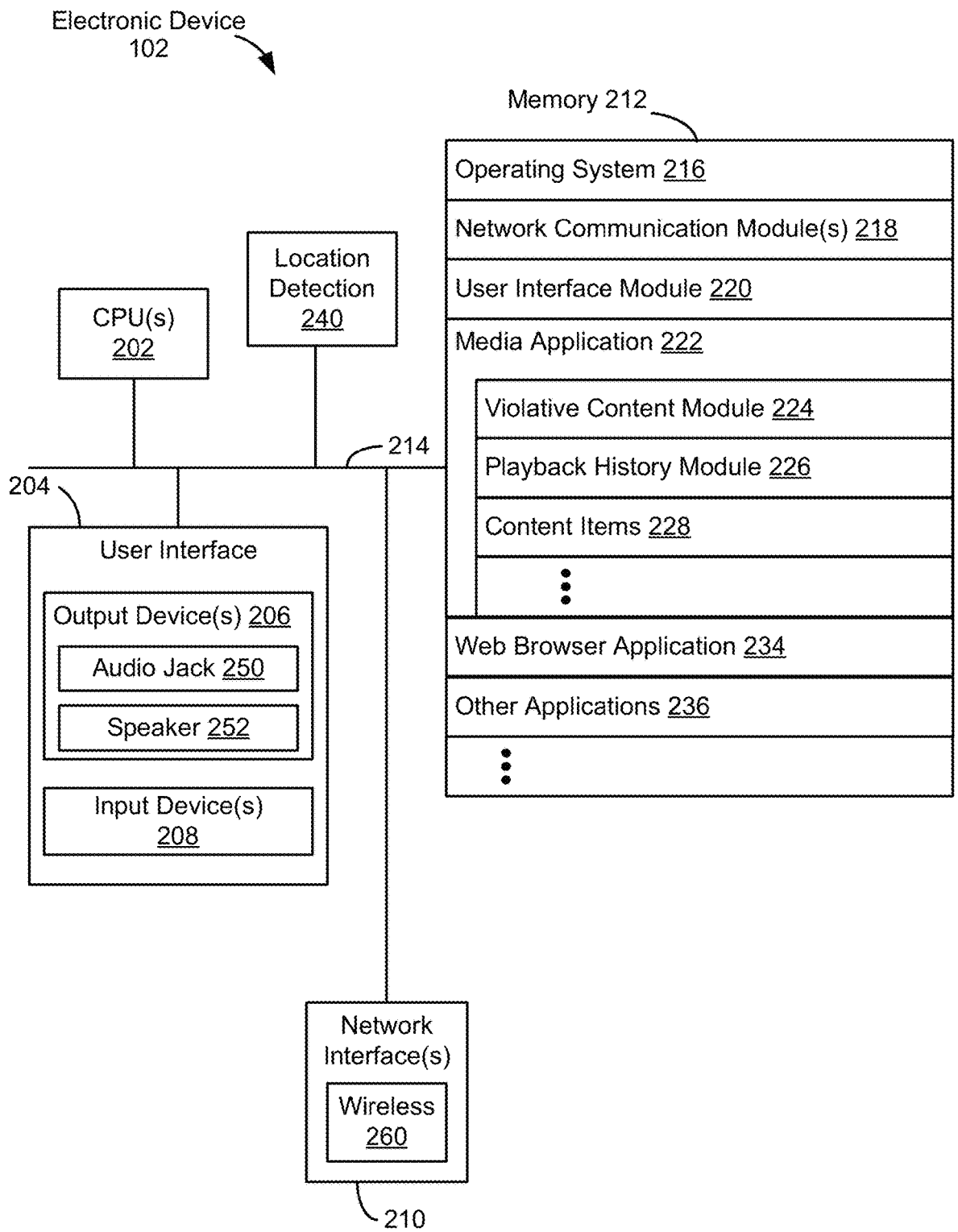
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s), media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206); 1a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
    - a violative content module 224 for identifying and/or storing indications of one or more violative content items (also referred to herein as seed content items) in accordance with the content item violating one or more policies of the media-providing service, including storing indications of flagged or taken down content items;
    - a playback history module 226 for storing, for a user of the electronic device 102, indications of content items that have been consumed by the user, and optionally consumption metadata (e.g., an amount of time consumed, partial or full consumption, a number of times consumed, etc.) gathered during playback of the content item;
    - a content items module 228 for storing media items, including audio items such as podcasts and songs, for playback and/or for forwarding requests for media content items to the media content server;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
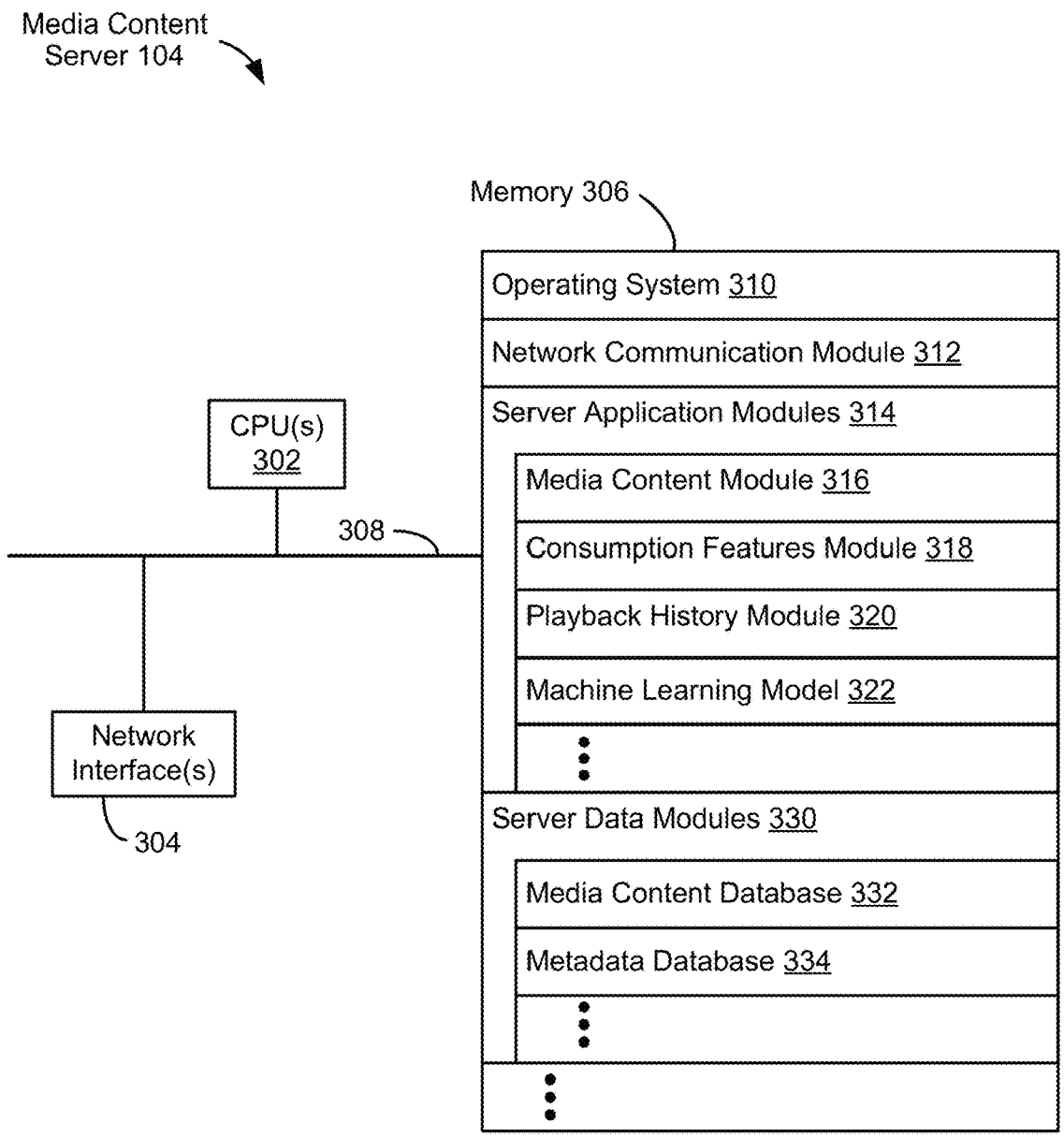
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
    - a media content module 316 for storing one or more media content items and/or sending (e.g., streaming), to the electronic device, one or more requested media content item(s);
    - a consumption features module 318 for generating consumption features to be input to a machine learning model 322 for identifying potential violative content items, including optionally generating a graph between content items and users to identify the consumption features (e.g., as described with reference to FIG. 4B);
    - a playback history module 320 for accessing and/or storing, for a plurality of users of the media-providing service, indications of content items that have been consumed by respective users, and optionally consumption metadata (e.g., an amount of time consumed, partial or full consumption, a number of times consumed, etc.) gathered during playback of the content items;
    - a machine learning model 322 for predicting a probability that a respective content item is a violative content item, whereby the machine learning model is trained using inputs obtained from seed violative content items;
- one or more server data module(s) 330 for handling the storage of and/or access to media items and/or metadata relating to the media items; in some embodiments, the one or more server data module(s) 330 include:
    - a media content database 332 for storing media items; and
    - a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
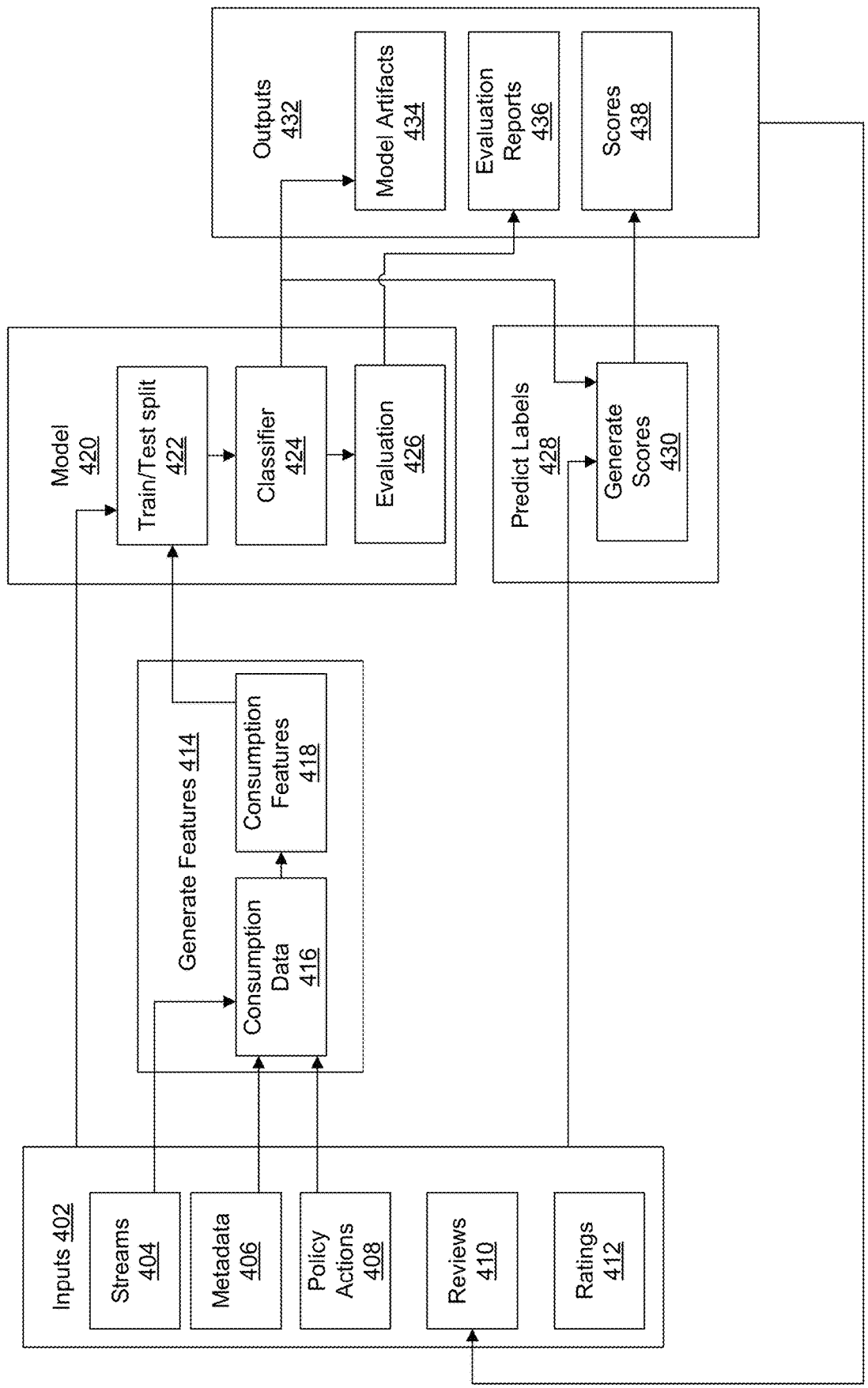
FIG. 4A is a block diagram illustrating a system for determining, using machine learning, a likelihood that a content item is violative, in accordance with some embodiments

FIG. 4A illustrates a block diagram of a system for predicting violative content items, in accordance with some embodiments. Unlike a typical system, the methods described herein predict violative content items based on historical user-item interactions (e.g., user playback behavior as it relates to content items, such as adding content items to a playlist, repeating playback of content items, etc.), including user-item interactions with content items that are known to be violative (e.g., without processing the audio, video, transcript or associated metadata (e.g., summaries or episode descriptions) of the media content item). Because the user-item interactions do not rely on the audio, video, transcript or metadata content, the methods described herein are robust in their invariance to language, invariance to culture, market, content type, keywords (evolution of language), and topics/themes. As described in more detail below, in some embodiments, a machine learning model 420 predicts a likelihood (e.g., indicated by scores 438) that a respective content item violates a policy (or a plurality of policies) of the media-providing service, and optionally predicts which policy (or policies) the respective content item violates.

In some embodiments, a plurality of inputs 402 are provided to train a model 420 (e.g., a classifier or other machine learning model). In some embodiments, the plurality of inputs 402 include, for a respective content item (e.g., a podcast episode or a track), one or more of: a number of streams 404 of the content item (e.g., and/or a streaming history of the content item), metadata 406 associated with the content item (e.g., including user-item metadata and content metadata (e.g. tenure)), a number of policy actions 408 of the content item (e.g., takedowns, flags, or other policy labels), reviews 410 of the content item, and ratings 412 of the content item. In some embodiments, the inputs 402 used for training model 420 include inputs for a plurality of content items that are known to be violative content items (e.g., by manual labelling by human experts and/or identified using the model 420). In some embodiments, the known violative content items are referred to herein as seed content items.

In some embodiments, for the respective content item, a subset, less than all, of the inputs 402 are used to generate features 414 (e.g., consumption features 418), which are also provided as inputs to train model 420. For example, a number of streams 404, metadata 406 and number of policy actions 408 are input to generate features 414. In some embodiments, the subset of inputs 402 are combined as (e.g., referred to collectively as) consumption data 416. In some embodiments, consumption data 416 (and the subset of inputs 402) are retrieved from playback histories of media items (e.g., in the library) of the media-providing service.

Figure 4B:
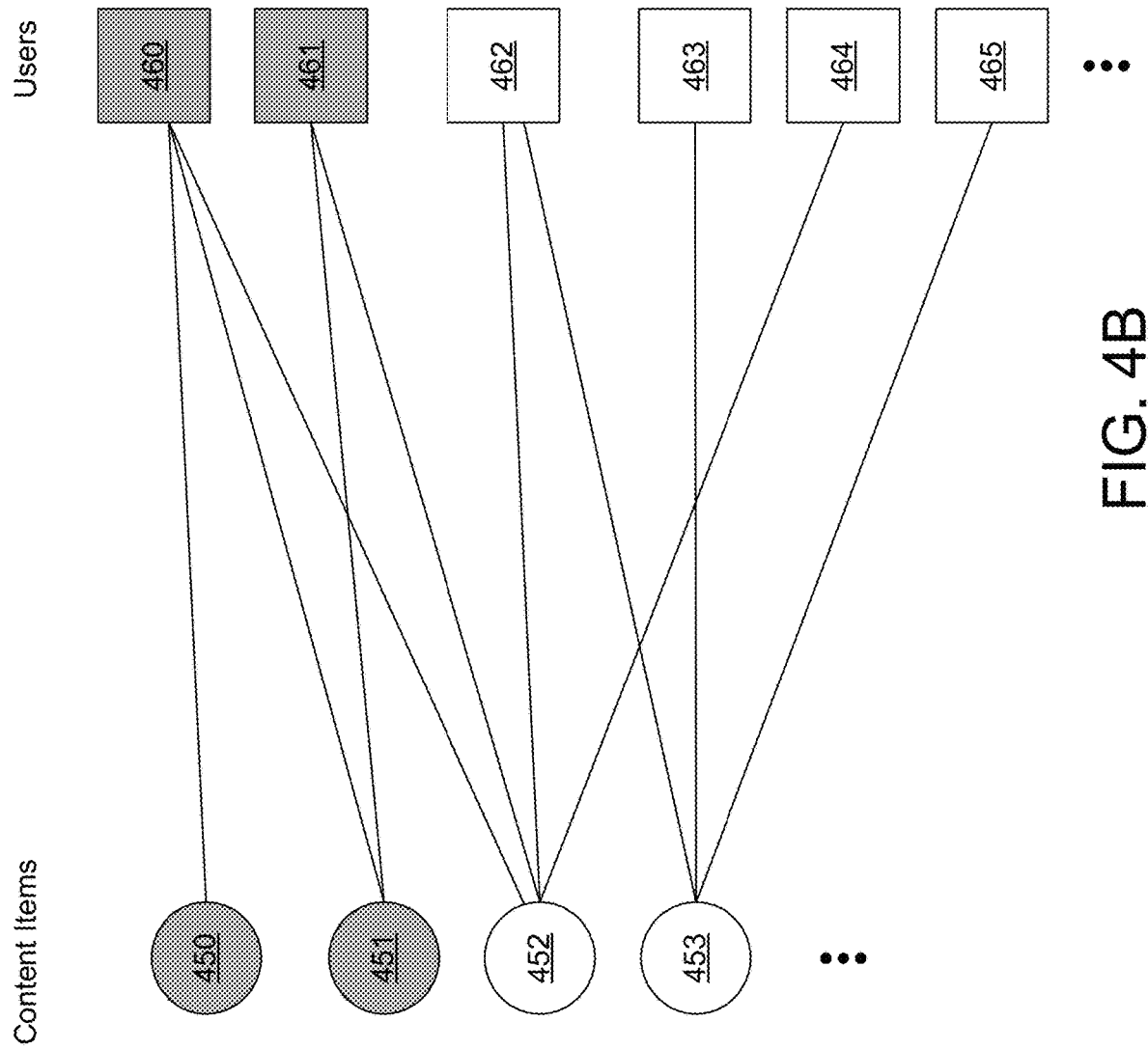
FIG. 4B is a block diagram illustrating a graph connecting respective content items with users that have consumed the content item, in accordance with some embodiments.

In some embodiments, the consumption data 416 is translated into a plurality of consumption features 418. In some embodiments, the consumption features 418 are determined based on a graph that is generated using the inputs 402. For example, the graph illustrated in FIG. 4B is generated from the playback histories of media items of the media-providing service. As described in more detail below, in some embodiments, the graph is generated by comparing the audience of a respective content item (e.g., podcast episode or track) with the audience of content items (e.g., other podcast episodes or tracks) previously found in breach of content policies. The more the audiences of the respective content item and violative content items in the set of seed item overlap, the more likely the respective content item is also in breach of the policies.

In some embodiments, consumption features 418 are extracted from the generated graph and are input to a model 420 for training. In some embodiments, the consumption features 418 correspond to a vector that represents an audience (e.g., a number of users) that has previously consumed a respective seed media item, an audience (e.g., a number of users) that has never consumed violative content (also referred to as non-seed users or non-seed audience), and a number of ways to connect with previously consumed violative content.

As such, in some embodiments, the model 420 is trained using the plurality of inputs 402, and/or using the consumption features 418 as inputs. For example, the model is trained 422. In some embodiments, the model is a classifier 424 that is trained to evaluate 426 (e.g., classify) whether a particular content item is likely to be violative (e.g., and optionally causes a device to display or otherwise provide the evaluation reports 436 as an output of the model). In some embodiments, the classifier 424 outputs model artifacts 434.

In some embodiments, the model 420 generates outputs 432, including evaluation reports 436, and the model optionally outputs scores 438 (e.g., representing a likelihood of a respective media item being assigned a particular label of the predicted labels 428). In some embodiments, the predicted labels 428 include a likely-violative label and a likely-non-violative label. In some embodiments, the predicted labels 428 include a type of violative content label (e.g., hate speech, misinformation, copyright infringement, self-harm, deceptive medical misinformation, explicit material, or another category of violative content). For example, the inputs 402 include one or more labels corresponding to types of violative content (e.g., categories of violative content), and the model 420 classifies media items according to the one or more labels. In some embodiments, the predicted labels 428 (and optionally scores for the labels) are assigned for each item ID that is received from inputs 402 (e.g., inputs 402 sends an item ID for each media content item).

In some embodiments, the model 420 outputs a threshold number (e.g., or at least a threshold number or at most a threshold number) of content items based on the scores determined for the content items. For example, the model 420 outputs the top 100 content items having the highest score (e.g., the greatest likelihood of being a violative content item).

In some embodiments, the trained model 420 is used to predict a likelihood that a respective media content item (of a plurality of media content items input to model 420) is a violative content item. For example, for the respective media content item (e.g., where it is unknown whether the content item is violative or non-violative), consumption features 418 are generated using the playback histories of users of the media-providing service, and input to trained model 420. Trained model 420 outputs a likelihood (e.g., a score 438) that the respective media content item is violative.

In some embodiments, after generating scores 438, the inputs 402 are updated to include the respective media content item that has been labeled according to the model (and/or by a human reviewer). For example, the system is recursive in that, if a media content item is evaluated as being violative, it is used to regenerate (or update) the consumption features 418. For example, the graph illustrated in FIG. 4B is updated based on whether a media content item is determined as being violative or non-violative.

FIG. 4B illustrates a graph generated from audience consumption of a plurality of content items. The graph includes a plurality of nodes, including nodes 450-453 representing content items and nodes 460-465 representing anonymized users (e.g., of the audience(s) for each content item). In some embodiments, a first subset of the nodes 450-453, including the known violative content items (e.g., also referred to herein as seed content items), are shaded and a second subset of the nodes corresponding to content items that have not yet been determined as violative (e.g., also referred to as candidates) and are not shaded. For example, the shaded content items 450 and 451 represent content that is known to the system to include violative content (e.g., the content satisfies one or more violative criteria). In some embodiments, nodes that are identified by their high score as likely to be violative of one theme (e.g., one type of violating content) are prioritized. For example, nodes 450 and 451 correspond to content items that violate a first policy type, wherein the model is used to identify violations of the first policy type (e.g., a model that identifies one type of violative content). In some embodiments, nodes that are identified as any type of violative content are considered in the graph (e.g., all known violative content items are shaded in the graph). It will be understood that the model is thus enabled to be adjusted to target a particular type of violative content.

In some embodiments, the candidate content items are identified as content items that are within the playback history of the users represented by user nodes 460-465. In some embodiments, user nodes 460-465 correspond to users of the media-providing service, and include users that have consumed known violative media content items (e.g., shaded nodes 460 and 461 have consumed at least one (or a threshold number of known violative media content items 450 and/or 451). For example, although users 462-465 are not connected to violative content item nodes 450 or 451, in some embodiments, the graph includes additional content items that are not illustrated in FIG. 4B, including additional violative content items (e.g., known additional seed items) that user nodes 462-465 have consumed. In some embodiments, the graph optionally also includes users that have not consumed at least one (or a threshold number) of known violative media content items.

In some embodiments, a playback history of each of the users represented by user nodes 460-465 is obtained. In some embodiments, the playback history of each user indicates respective content items that have been consumed by the user. In some embodiments, a portion, less than all, of the playback history is retrieved. For example, only the playback history of the last 150 days (or another amount of time) and/or only the previously consumed 100 media items, is obtained. In some embodiments, the playback history further indicates whether only a portion, less than all, of a content item was consumed by the user. For example, a respective content item stored in the playback history of a user is considered consumed by the user in accordance with a determination that the user consumed a threshold amount of the content item (e.g., 5%, 10%, or at least 30 seconds, at least 1 minute, etc.). In some embodiments, the playback history further indicates a number of times a user has consumed a respective content item.

Each connector (e.g., edge) of the graph in FIG. 4B represents consumption of a content item by a respective user. As such, the graph illustrates content items that are consumed by users who have also consumed the violative (e.g., seed) content items 450 and/or 451. Although the example described herein refers to using connections between seeds to users of the audience of the seeds, to candidate content items, in some embodiments, additional connections (e.g., edges of the graph) are used to identify connections between other content items, audiences, and/or candidates.

In some embodiments, information obtained from the graph is used to generate consumption features 418 (which are then input to model 420). For example, based on the results of the graph (e.g., the structure of the graph, including its edges), the consumption features include one or more of: a number of users that have previously listened to (e.g., consumed) one or more of (or another threshold number of) violative content items and listened to the respective candidate content item, a number of users that have not previously listened to one or more of (or another threshold number of) violative content items and listened to the respective candidate content item, and a number of ways the respective candidate content item is connected with previously consumed violative content items (e.g., by counting a number of possible paths between violative content and the respective candidate content item, to account for how much each user has listened to violative content).

For example, content item 452 (FIG. 4B) has been consumed by (e.g., as indicated by the edges in the graph) two users that have consumed known violative content item (e.g., user nodes 460 and 461) and has also been consumed by two users that have not consumed the known violative content items (e.g., user nodes 462 and 464). In some embodiments, the system generates consumption features using this information (e.g., the number of users from each set of users that have consumed the content item), and provides the consumption features as inputs to the model 420.

As such, the model 420 accounts for both users that have consumed known (e.g., previously labeled) violative content items (e.g., a first audience) and for users that have not consumed violative content items (e.g., a second audience). For example, if the number of users in the second audience is much greater than the number of users in the first audience, the likelihood that the respective content violative is less than the if number of users in the second audience is fewer than the number of users in the first audience. For example, content item 453 has been consumed by users in the second set of users, but has not been consumed by users in the first set of users, and therefore the content item 453 is considered to be likely non-violative. In some embodiments, providing the model 420 with inputs that include information on user consumption behavior for violative and non-violative content items enables the model 420 to predict whether other content items (e.g., nodes 452 or 453) are likely to be violative. Accordingly, based on a co-occurrence of consumption of seed content items and other candidates, the model 420 determines a likelihood (e.g., scores 438) that a candidate content item (e.g., 452 or 453) is violative.

It will be understood that although nodes 460-465 represent users, the method described herein does not punish or take action against a particular user. In some embodiments, users are anonymized. As such, the model determines a likelihood that a respective candidate content item is violative based on the playback histories of users (e.g., based on users that have consumed known violative content items), and optionally takes down or flags candidate content items that are likely to violate one or more policies of the media-providing service, without storing user-identifying information.

FIGS. 5A-5C are flow diagrams illustrating a method 500 of predicting candidate content items that violate one or more policies of a media-providing service, in accordance with some embodiments. Method 500 may be performed at an electronic device (e.g., media content server 104 and/or electronic device(s) 102) having one or more processors and memory storing instructions for execution by the one or more processors. In some embodiments, the method 500 is performed by executing instructions stored in the memory (e.g., memory 212, FIG. 2, memory 306, FIG. 3) of the electronic device. In some embodiments, the method 500 is performed by a combination of the server system (e.g., including media content server 104 and CDN 106) and a client device.

Referring now to FIG. 5A, in performing the method 500, the electronic device identifies (502) a set of seed content items, wherein each seed content item in the set of seed content items corresponds to a violative content item. For example, the set of seed content items is a set of known (e.g., labeled) violative content items. As described below, in some embodiments, the set of seed content items is updated (e.g., over time) as additional media content items are identified as being violative. For example, content items represented by nodes 450 and 451 are seed content items that are known as violative content items.

In some embodiments, the electronic device accesses (504) a respective playback history for each content item. In some embodiments, the playback history for the content items include indications of audiences that have and that have not consumed at least one of the seed content items.

In some embodiments, identities of the users in a respective audience (e.g., indicated in the playback history, also referred to as consumption history) are (506) anonymized. For example, in the graph of FIG. 4B, users are identified as being in the first audience or second audience (e.g., based on whether the user has consumed at least a threshold number of seed (e.g., violative) content items), but identities of the individual users are not stored in the graph or input to the model 420.

The electronic device determines (508), using the playback histories, connections between a respective content item and a first audience that has consumed the respective content item and that has consumed at least a threshold number of seed content items from the set of seed content items. In some embodiments, determining that a first audience has consumed at least a threshold number of seed content items from the set of seed content items includes filtering and/or weighing candidate content items that users of the first audience have consumed. For example, the connections illustrated in the graph of FIG. 4B represent which content items of items 450-453 each of the users 460-465 in audiences have consumed based on the playback history of each user. In some embodiments, each of the users 460-465 have consumed at least a threshold number of seed content items (e.g., at least one violative content item).

In some embodiments, the electronic device determines (510) that a respective audience has consumed respective seed content item from the set of seed content items in accordance with a determination that the audience has consumed the respective seed content item within a predefined time period (e.g., in the last 150 days, in the last week, or another amount of time). By limiting the scope of consumption (e.g., within a user's playback history) to a predefined time period, leakage of information is avoided because content that is not taken down is likely to have more listeners compared to violative content that has been taken down.

In some embodiments, the electronic device trains (512), using unsupervised learning, the machine learning model using the connections and information about respective content (e.g., additional information to the consumption data in the listening history, such as podcast topics, transcriptions, embedding vectors). In some embodiments, the machine learning model 420 is trained based on metadata 406 of content items. For example, inputs 402 are used to train model 420, as well as the subset of inputs obtained from the graph (e.g., consumption features 418).

The electronic device provides (514) information corresponding to the connections as an input to a machine learning model. For example, the consumption features 418, determined based on connections between respective users and seed content items, are input to model 420. For example, content item 452 (FIG. 4B) has been consumed by (e.g., as indicated by the edges in the graph) two users in the first set of users (e.g., 460 and 461) and has also been consumed by two users in the second set of users (e.g., 462 and 464), and these consumption features (e.g., including a number of users from each audience that have consumed the content item and/or the structure of the graph) are input to the model 420.

In some embodiments, the electronic device identifies (516), using the playback histories, a second set audience, distinct from the first audience, that has consumed the respective content item and content items having an unknown violative status. For example, in FIG. 4B, the first set of users 460 and 461 in a first audience have consumed known violative content items 450 and 451, while the second audience with users 462-465 have not consumed the known violative content items 450 or 451 (e.g., and thus have not satisfied the threshold number of violative content items). In some embodiments, the electronic device provides information corresponding to the second audience as an input to the machine learning model. For example, features of the playback histories of the second audience with users 462-465 are provided to the model. As such, the machine learning model 420 accounts for both the first audience that has consumed violative content items and for the second audience that has not consumed violative content items. For example, content item 453 has been consumed by users in the second audience, but has not been consumed by users in the first audience, and therefore the content item 453 is likely to be considered non-violative.

In some embodiments, the electronic device obtains (518) (or generates) a graph (e.g., as described with reference to FIG. 4B) that includes a plurality of content items, including the seed content items (e.g., 450 and 451) and the respective content item (e.g., 452 or 453), the first audience (e.g., users 460 and 461) and the second audience (e.g., users 462-465), and edges connecting a user in a respective audience with one or more content items of the plurality of content items, wherein each edge indicates the user in the respective audience has consumed the content item. In some embodiments, the electronic device provides information corresponding to the connections, including information corresponding to the edges in the graph as an input to a machine learning model. In some embodiments, the machine learning model 420 is trained using known violative content items (e.g., identified manually by an administrator or otherwise previously labelled as violative).

In some embodiments, for the respective content item, the electronic device identifies (520) one or more consumption statistics (e.g., "Features") of the respective content item (e.g., a number of streams, metadata, a number of takedowns). In some embodiments, the electronic device provides the one or more consumption statistics of the respective content item as an input to the machine learning model. In some embodiments, the one or more consumption statistics (e.g., inputs 402, FIG. 4A) are used for training 422 the model 420. In some embodiments, the model 420 is trained using unsupervised learning.

The electronic device receives (522), as an output from the machine learning model, likelihoods that respective content items are violative content items. For example, the model 420 produces scores 438 that represent probabilities that respective content items are violative (e.g., likelihoods that the classifier classified a content item as having a particular label of the predicted labels 428).

In some embodiments, a content item is violative (524) in accordance with the content item including dangerous content, deceptive content, inappropriate content, and/or illegal content. In some embodiments, the content item is violative in accordance with a determination that the model outputs score 430 for a violative label (e.g., of labels 428) that satisfies a threshold score (e.g., or flagging a threshold number, such as the top k highest scoring content items, where k is an integer greater than 1). For example, the likelihood that a respective media item is classified as the violative label must satisfy the likelihood criteria.

The electronic device stores (526) a set of content items, selected using the output from the machine learning model, as candidate content items in accordance with a determination that the content item satisfies likelihood criteria. In some embodiments, the likelihood criteria is a threshold score (e.g., probability) that a respective content item is violative. In some embodiments, the candidate content items are included in a subsequent round of executing the model described herein. For example, after a candidate content item is identified as violative (e.g., in accordance with a determination by human reviewers that the content item satisfies the likelihood criteria), the candidate content item is used as a seed content item (e.g., included in inputs 402, FIG. 4A). As such, the model is continually refined by identifying additional violative content to be used as inputs, which then also updates consumption features 418 (e.g., and the graph in FIG. 4B).

In some embodiments, the stored set of content items as candidate content items are (528) not included in the identified set of seed content items (e.g., the candidate content items are not yet determined as violative or not). For example, the candidate content items 452 and 453 in FIG. 4B are not yet determined as violative or not, while the seed content items 450 and 451 are identified as violative content items. In some embodiments, candidate content items that are not identified as violative (e.g., do not satisfy the likelihood criteria) are not included in the set of seed content items.

In some embodiments, the set of content items comprises (530) a set of podcast episodes or shows. In some embodiments, each content item in the set of content items comprises video and/or audio content.

In some embodiments, the electronic device updates (532) the set of seed content items to a second set of content items that includes content items from the one or more candidate content items (e.g., based on a determination that the media contents items do, in fact, violate a policy). For example, the graph in FIG. 4B is updated in accordance with a determination that a content item is determined as violative (e.g., if content item 452 is determined as violative, the graph is updated to include content item 452 as a seed content item).

In some embodiments, in accordance with a determination that the content item satisfies the likelihood criteria, the electronic device removes (534) the content item from a playlist. For example, one or more content items that are likely to be violative (e.g., satisfy the likelihood criteria) are removed from playlists (e.g., that are curated and/or recommended by the media-content provider without user input), optionally without removing the one or more content items from the catalog and/or from search results.

In some embodiments, in accordance with a determination that the content item satisfies the likelihood criteria, the electronic device forgoes displaying (536) a representation of the content item in a user interface displayed on a user device. For example, the system flags the violative content item (e.g., for review by a human reviewer), which is then prevented (e.g., by the human reviewer) from being presented (e.g., displayed and/or streamed) to users. In some embodiments, the electronic device quarantines, or otherwise flags, the content item in accordance with a determination that the content item satisfies the likelihood criteria.

In some embodiments, in accordance with a determination that the content item satisfies the likelihood criteria, the electronic device displays (538) a user interface element that includes a warning that the content item is likely to be a violative content item. In some embodiments, the user interface element is displayed to one or more administrators of the media-providing service, wherein the administrators are enabled to investigate whether the content item does violate one or more policies of the media-providing service. In some embodiments, administrators are enabled to remove (e.g., take down, block, or forgo recommending) content that has been determined as being violative.

In some embodiments, the electronic device concurrently displays indications of the candidate content items in an application user interface for a human reviewer and a user interface element for each indication of the candidate content items that, when selected, marks a respective candidate content item as a violative content item.

Although FIGS. 5A-5C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for the purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method of predicting candidate content items that violate one or more policies of a media-providing service, including:
   at an electronic device:
      identifying a set of seed content items, wherein each seed content item in the set of seed content items corresponds to a violative content item;
      determining, using playback histories indicating consumption of content items, connections between a first content item and a first audience that has consumed the first content item and that have consumed at least a threshold number of seed content items from the set of seed content items;
      providing information corresponding to the connections as an input to a machine learning model;
      receiving, as an output from the machine learning model, likelihoods that respective content items are violative content items;
      storing a set of content items, selected using the output from the machine learning model, as candidate content items in accordance with a determination that each of the set of content items satisfies likelihood criteria; and
      in accordance with a determination that a particular content item of the candidate content items satisfies the likelihood criteria, displaying a user interface element that includes a warning that the particular content item is likely to be a violative content item.

2. The method of claim 1, wherein the stored set of content items as candidate content items, are not included in the identified set of seed content items.

3. The method of claim 1, further comprising, updating the set of seed content items to a second set of content items that includes content items from the one or more candidate content items.

4. The method of claim 1, further comprising,
   using the playback histories, identifying a second audience, distinct from the first audience, that has consumed the first content item and content items having an unknown violative status; and
   providing information corresponding to the second audience as an input to the machine learning model.

5. The method of claim 4, further comprising, obtaining a graph that includes:
   a plurality of content items, including the seed content items and the first content item;
   the first audience and the second audience;
   edges connecting a user in a respective audience with one or more content items of the plurality of content items, wherein each edge indicates the user in the respective audience has consumed the content item;
   wherein providing information corresponding to the connections comprises providing information corresponding to the edges in the graph as an input to a machine learning model.

6. The method of claim 1, further comprising:
   for the first content item, identifying one or more consumption statistics of the first content item; and
   providing the one or more consumption statistics of the respective content item as an input to the machine learning model.

7. The method of claim 1, further comprising, training, using unsupervised learning, the machine learning model using the connections and information about respective content.

8. The method of claim 1, wherein the set of content items comprises a set of podcast episodes.

9. The method of claim 1, including determining that a respective audience has consumed a respective seed content item from the set of seed content items in accordance with a determination that the audience has consumed the respective seed content item within a predefined time period.

10. The method of claim 1, wherein identities of users in the first audience are anonymized.

11. The method of claim 1, wherein a content item is violative in accordance with the content item including dangerous content, deceptive content, inappropriate content, and/or illegal content.

12. The method of claim 1, further comprising, in accordance with a determination that the particular content item satisfies the likelihood criteria, removing the particular content item from a playlist.

13. The method of claim 1, further comprising, in accordance with a determination that the particular content item satisfies the likelihood criteria, forgoing displaying a representation of the particular content item in a user interface displayed on a user device.

14. The method of claim 1, further comprising, concurrently displaying indications of the candidate content items in an application user interface for a human reviewer and a user interface element for each indication of the candidate content items that, when selected, marks a respective candidate content item as a violative content item.

15. An electronic device, comprising:
   one or more processors; and
   memory storing one or more programs, the one or more programs including instructions for:
      identifying a set of seed content items, wherein each seed content item in the set of seed content items corresponds to a violative content item;
      determining, using playback histories indicating consumption of content items, connections between a first content item and a first audience that has consumed the first content item and that has consumed at least a threshold number of seed content items from the set of seed content items;
      providing information corresponding to the connections as an input to a machine learning model;
      receiving, as an output from the machine learning model, likelihoods that respective content items are violative content items;
      storing a set of content items, selected using the output from the machine learning model, as candidate content items in accordance with a determination that each of the set of content items satisfies likelihood criteria; and in accordance with a determination that a particular content item of the candidate content items satisfies the likelihood criteria, displaying a user interface element that includes a warning that the particular content item is likely to be a violative content item.

16. The electronic device of claim 15, wherein the stored set of content items as candidate content items, are not included in the identified set of seed content items.

17. The electronic device of claim 15, the one or more programs further including instructions for updating the set of seed content items to a second set of content items that includes content items from the one or more candidate content items.

18. The electronic device of claim 15, the one or more programs further including instructions for:

using the playback histories, identifying a second audience, distinct from the first audience, that has consumed the first content item and content items having an unknown violative status; and providing information corresponding to the second audience as an input to the machine learning model.

19. The electronic device of claim 18, the one or more programs further including instructions for obtaining a graph that includes:

a plurality of content items, including the seed content items and the first content item;

the first audience and the second audience;

edges connecting a user in a respective audience with one or more content items of the plurality of content items, wherein each edge indicates the user in the respective audience has consumed the content item;

wherein providing information corresponding to the connections comprises providing information corresponding to the edges in the graph as an input to a machine learning model.

20. A non-transitory computer-readable storage medium storing one or more programs for execution by an electronic device with one or more processors, the one or more programs comprising instructions for:

identifying a set of seed content items, wherein each seed content item in the set of seed content items corresponds to a violative content item;

determining, using playback histories indicating consumption of content items, connections between a first content item and a first audience that has consumed the first content item and that has consumed at least a threshold number of seed content items from the set of seed content items;

providing information corresponding to the connections as an input to a machine learning model;

receiving, as an output from the machine learning model, likelihoods that respective content items are violative content items;

storing a set of content items, selected using the output from the machine learning model, as candidate content items in accordance with a determination that each of the set of content items satisfies likelihood criteria; and in accordance with a determination that a particular content item of the candidate content items satisfies the likelihood criteria, displaying a user interface element that includes a warning that the particular content item is likely to be a violative content item.

* * * * *